United States Patent
Sakurai

(10) Patent No.: US 8,159,710 B2
(45) Date of Patent: Apr. 17, 2012

(54) IMAGE SCANNING APPARATUS, IMAGE FORMING APPARATUS AND IMAGE SCANNING METHOD

(75) Inventor: Atsushi Sakurai, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1035 days.

(21) Appl. No.: 12/104,501

(22) Filed: Apr. 17, 2008

(65) Prior Publication Data

US 2008/0259413 A1 Oct. 23, 2008

Related U.S. Application Data

(60) Provisional application No. 60/912,201, filed on Apr. 17, 2007.

(51) Int. Cl.
*G06K 15/00* (2006.01)
*G06F 3/12* (2006.01)
*H04N 1/00* (2006.01)
*H04N 1/40* (2006.01)
*G06K 9/54* (2006.01)
*G06K 9/60* (2006.01)

(52) U.S. Cl. ............. 358/1.16; 358/1.15; 358/1.17; 358/403; 358/404; 358/444; 382/305; 382/306

(58) Field of Classification Search .............. None
See application file for complete search history.

(56) References Cited

U.S. PATENT DOCUMENTS

| | | | | | |
|---|---|---|---|---|---|
| 6,075,622 | A * | 6/2000 | Hadgis et al. | ............... | 358/474 |
| 6,961,142 | B2 * | 11/2005 | Miyajima | ............... | 358/1.15 |
| 7,027,194 | B2 * | 4/2006 | Kanda | ............... | 358/496 |
| 7,136,179 | B2 * | 11/2006 | Ohara | ............... | 358/1.15 |
| 7,345,794 | B2 * | 3/2008 | Matsui | ............... | 358/474 |
| 7,522,321 | B2 * | 4/2009 | Chen | ............... | 358/498 |
| 7,626,735 | B2 * | 12/2009 | Mizuhashi et al. | ............... | 358/474 |
| 7,710,613 | B2 * | 5/2010 | Michiie et al. | ............... | 358/474 |
| 7,751,099 | B2 * | 7/2010 | Mizuhashi et al. | ............... | 358/474 |
| 7,864,370 | B2 * | 1/2011 | Oda | ............... | 358/1.9 |
| 2004/0252355 | A1 * | 12/2004 | Chen | ............... | 358/497 |
| 2009/0161185 | A1 * | 6/2009 | Hashizume | ............... | 358/518 |
| 2009/0231638 | A1 * | 9/2009 | Umezawa | ............... | 358/474 |
| 2010/0110499 | A1 * | 5/2010 | Baba | ............... | 358/451 |
| 2010/0309528 | A1 * | 12/2010 | Nacman et al. | ............... | 358/444 |
| 2011/0032579 | A1 * | 2/2011 | Murakata | ............... | 358/403 |

FOREIGN PATENT DOCUMENTS

JP 09-116714 5/1997
JP 2003-333309 11/2003

* cited by examiner

*Primary Examiner* — Mark K Zimmerman
*Assistant Examiner* — Satwant Singh
(74) *Attorney, Agent, or Firm* — Turocy & Watson, LLP

(57) ABSTRACT

An image scanning apparatus according to the invention includes a face-side scanning unit and a back-side scanning unit that simultaneously scan both sides of an original, a page memory in which each image element outputted from the face-side scanning unit and the back-side scanning unit is stored at a required memory address and thus a scanning output image of the face-side image and the back-side image is constructed, and a face-side address calculating unit and a back-side address calculating unit that calculate a memory address at which each image element should be stored. The memory address at which each image element should be stored is decided in accordance with information of the main scanning direction of the face-side scanning unit and the back-side scanning unit, and the information of whether the original type of an original to be scanned is a booklet type or a tablet type.

20 Claims, 6 Drawing Sheets

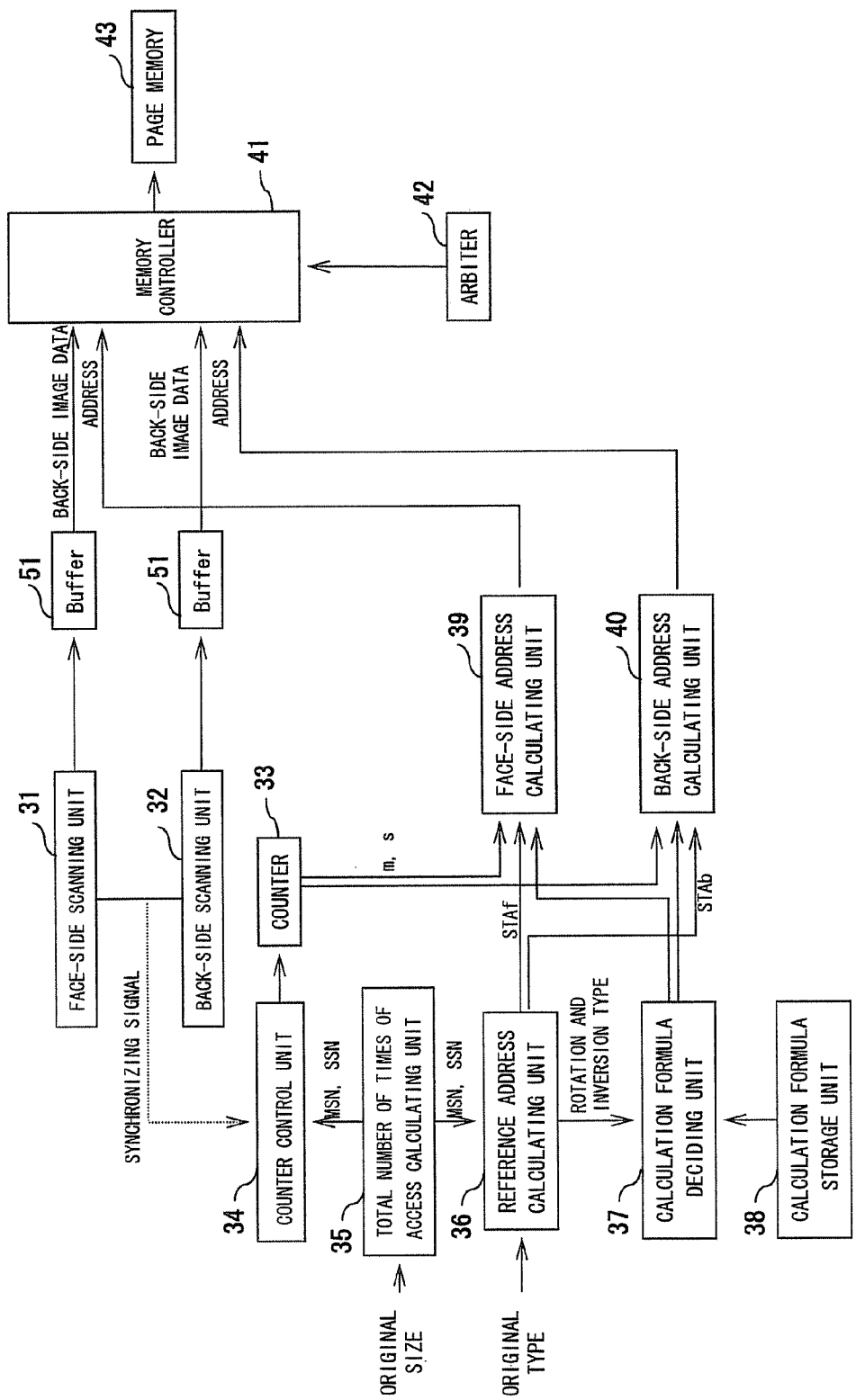
F I G. 2

NORMAL IMAGE

LEFT-RIGHT INVERTED IMAGE

180° ROTATED IMAGE

UP-DOWN INVERTED IMAGE

IMAGE SCANNING APPARATUS, IMAGE FORMING APPARATUS AND IMAGE SCANNING METHOD

CROSS-REFERENCE TO RELATED APPLICATIONS

This application claims the benefit of priority of U.S. Provisional Application No. 60/912,201, filed Apr. 17, 2007, the entire contents of which are incorporated herein by reference.

BACKGROUND

1. Field

The present invention relates to an image scanning apparatus, an image forming apparatus and an image scanning method for simultaneously scanning both sides of an original document.

2. Description of the Related Art

Some image scanning apparatus such as a scanner and some image forming apparatuses such as a copy machine can simultaneously scan both sides of an original document. These image scanning apparatuses and image forming apparatuses have a face-side scanning unit that scans an image (hereinafter referred to as a face-side image) printed on one side (face side) of an original, and a back-side scanning unit that scans an image (hereinafter referred to as a back-side image) printed on the back side of the original.

In the image scanning apparatuses and image forming apparatuses of this type, for example, the face-side scanning unit and the back-side scanning unit are arranged facing each other. As an original is carried between the face-side scanning unit and the back-side scanning unit, both sides of the original can be scanned simultaneously.

Meanwhile, originals with printing done on both sides (hereinafter referred to as double-side originals) include two types of originals, depending on the top-bottom (up-down) relation of the face-side image and the back-side image.

The first type of double-side original is a so-called left-right binding type (hereinafter, referred to as a booklet type) in which the face-side image and the back-side image have the same up-down direction when the original is rotated by 180 degrees to an axis parallel to the up-down direction of the face-side image.

The second type of original is a so-called up-down binding type (hereinafter referred to as a tablet type) in which the face-side image and the back-side image have the same up-down direction when the original is rotated by 180 degrees to an axis perpendicular to the up-down direction of the face-side image (an axis parallel to the left-right direction). On the back side of the tablet type original, the image is rotated by 180 degrees, compared with the back side of the booklet type original.

Generally, the main scanning direction and the sub scanning direction of the face-side scanning unit and the back-side scanning unit are defined in advance in one direction each. Therefore, for example, in the case where each scanning direction of the face-side scanning unit and the back-side scanning unit is decided in such a way that images on the face side and the back side of a booklet type original can be acquired normally, for a tablet type original, the face-side image can be acquired normally but the back-side image is rotated by 180 degrees when it is acquired.

Conventionally, as a technique to correct an image that is rotated by 180 degrees or inverted in the left-right direction to an image with a normal up-down direction and left-right direction when simultaneously scanning both sides of an original (hereinafter referred to as normalization of image direction), after an image on each of the face side and the back side is scanned, the direction of the image can be normalized by proper rotation of the image or the like.

With the conventional technique, the scanned face-side image and back-side image can be stored in a storage medium such as a hard disk, with their up-down and left-right directions aligned. Therefore, with the conventional technique, various processing can be easily carried out on the basis of the scanned images, such as printing the image onto a recording paper, or creating and editing an image file.

In the conventional technique, however, in order to normalize the image direction, it is necessary to read out an image from a page memory after it is scanned and stored into the page memory, and then to normalize the image direction and store the image into a storage medium such as a hard disk. Therefore, it takes time to acquire a normal image. Thus, in the conventional technique, it takes time to simultaneously scan both sides of an original and execute various processing based on the scanned images, for example, when taking double-side copy of a double-side original.

SUMMARY OF THE INVENTION

The present invention has been made in light of the above situation, and accordingly it is an object of the present invention to provide an image scanning apparatus, an image forming apparatus and an image scanning method that enable execution of processing to normalize the image direction according to the type of a double-side original at the same time as simultaneous scanning of both sides of the original.

To solve the above problem, the image scanning apparatus according to one aspect of the present invention is an image scanning apparatus that simultaneously scans a face-side image and a back-side image of an original with respect to two types of originals of a booklet type and a tablet type. The apparatus includes: a face-side scanning unit configured to perform main scanning in a first direction along a main scanning direction and perform sub scanning in a predetermined direction along a sub scanning direction, thereby scan an image of a predetermined size at a time with respect to the face-side image of the original, and output the image of the predetermined size as a face-side image element having a predetermined data width; a back-side scanning unit configured to perform main scanning in a second direction parallel to the first direction and perform sub scanning in the predetermined direction along the sub scanning direction, thereby scan an image of the predetermined size at a time with respect to the back-side image of the original, and output the image of the predetermined size as a back-side image element having the predetermined data width; a face-side address calculating unit configured to calculate a memory address at which each of the face-side image elements should be stored according to the original type, with respect to each of the face-side image elements outputted from the face-side scanning unit; a back-side address calculating unit configured to calculate a memory address at which each of the back-side image elements should be stored according to the original type, with respect to each of the back-side image elements outputted from the back-side scanning unit; and an image data storage unit configured to store each of the face-side image elements and the back-side image elements to the memory address at which each element should be stored, and thereby store the face-side image and the back-side image. The face-side scanning unit and the back-side scanning unit scan the image of the predetermined size synchronously with a synchronizing signal and simultaneously with each other. The face-side address calculating unit and the back-side address calculating unit calculate the memory address at which each of the face-side image elements and each of the back-side image elements should be stored according to the original type, in such a manner that the face-side image and the back-side image to be stored in the image data storage unit have the same up-down direction and the same left-right direction.

Further, to solve the above problem, the image forming apparatus according to another aspect of the present invention is an image forming apparatus that simultaneously scans a face-side image and a back-side image of an original with respect to two types of originals of a booklet type and a tablet type. The apparatus includes: a scanner unit; and an image forming unit configured to print image scanned by the scanner unit, onto a recording paper. The scanner unit includes: a face-side scanning unit configured to perform main scanning in a first direction along a main scanning direction and perform sub scanning in a predetermined direction along a sub scanning direction, thereby scan an image of a predetermined size at a time with respect to the face-side image of the original, and output the image of the predetermined size as a face-side image element having a predetermined data width; a back-side scanning unit configured to perform main scanning in a second direction parallel to the first direction and perform sub scanning in the predetermined direction along the sub scanning direction, thereby scan an image of the predetermined size at a time with respect to the back-side image of the original, and output the image of the predetermined size as a back-side image element having the predetermined data width; a face-side address calculating unit configured to calculate a memory address at which each of the face-side image elements should be stored according to the original type, with respect to each of the face-side image elements outputted from the face-side scanning unit; a back-side address calculating unit configured to calculate a memory address at which each of the back-side image elements should be stored according to the original type, with respect to each of the back-side image elements outputted from the back-side scanning unit; and an image data storage unit configured to store each of the face-side image elements and the back-side image elements to the memory address at which each element should be stored, and thereby store the face-side image and the back-side image. The face-side scanning unit and the back-side scanning unit scan the image of the predetermined size synchronously with a synchronizing signal and simultaneously with each other. The face-side address calculating unit and the back-side address calculating unit calculate the memory address at which each of the face-side image elements and each of the back-side image elements should be stored according to the original type, in such a manner that the face-side image and the back-side image to be stored in the image data storage unit have the same up-down direction and the same left-right direction.

Further more, to solve the above problem, the image scanning method according to further aspect of the present invention is an image scanning method in which a face-side image and a back-side image of an original are simultaneously scanned with respect to two types of originals of a booklet type and a tablet type. The method includes: scanning the face-side comprising performing main scanning in a first direction along a main scanning direction and performing sub scanning in a predetermined direction along a sub scanning direction, thereby scanning an image of a predetermined size at a time with respect to the face-side image of the original, and outputting the image of the predetermined size as a face-side image element having a predetermined data width; scanning the back-side comprising performing main scanning in a second direction parallel to the first direction and performing sub scanning in the predetermined direction along the sub scanning direction, thereby scanning an image of the predetermined size at a time with respect to the back-side image of the original, and outputting the image of the predetermined size as a back-side image element having the predetermined data width; calculating a memory address at which each of the face-side image elements should be stored according to the original type; calculating a memory address at which each of the back-side image elements should be stored according to the original type; and storing each of the face-side image elements and the back-side image elements to the memory address at which each element should be stored, and thereby storing the face-side image and the back-side image into an image data storage unit.

The scanning the face-side and the scanning the back-side execute scanning the image of the predetermined size synchronously with a synchronizing signal and simultaneously with each other. In the calculating the memory address at which each of the front-side image elements should be stored and in the calculating the memory address at which each of the back-side image elements should be stored, the memory addresses are calculated according to the original type, in such a manner that the face-side image and the back-side image to be stored in the image data storage unit have the same up-down direction and the same left-right direction.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a view showing an exemplary configuration of an image scanning apparatus according to the embodiment;

DETAILED DESCRIPTION

Hereinbelow, a description will be given of a pointing device, and a method of displaying the remaining battery power of the pointing device, according to an embodiment of the present invention with reference to the drawings.

(1) Configuration of Image Forming Apparatus

Figure 1:
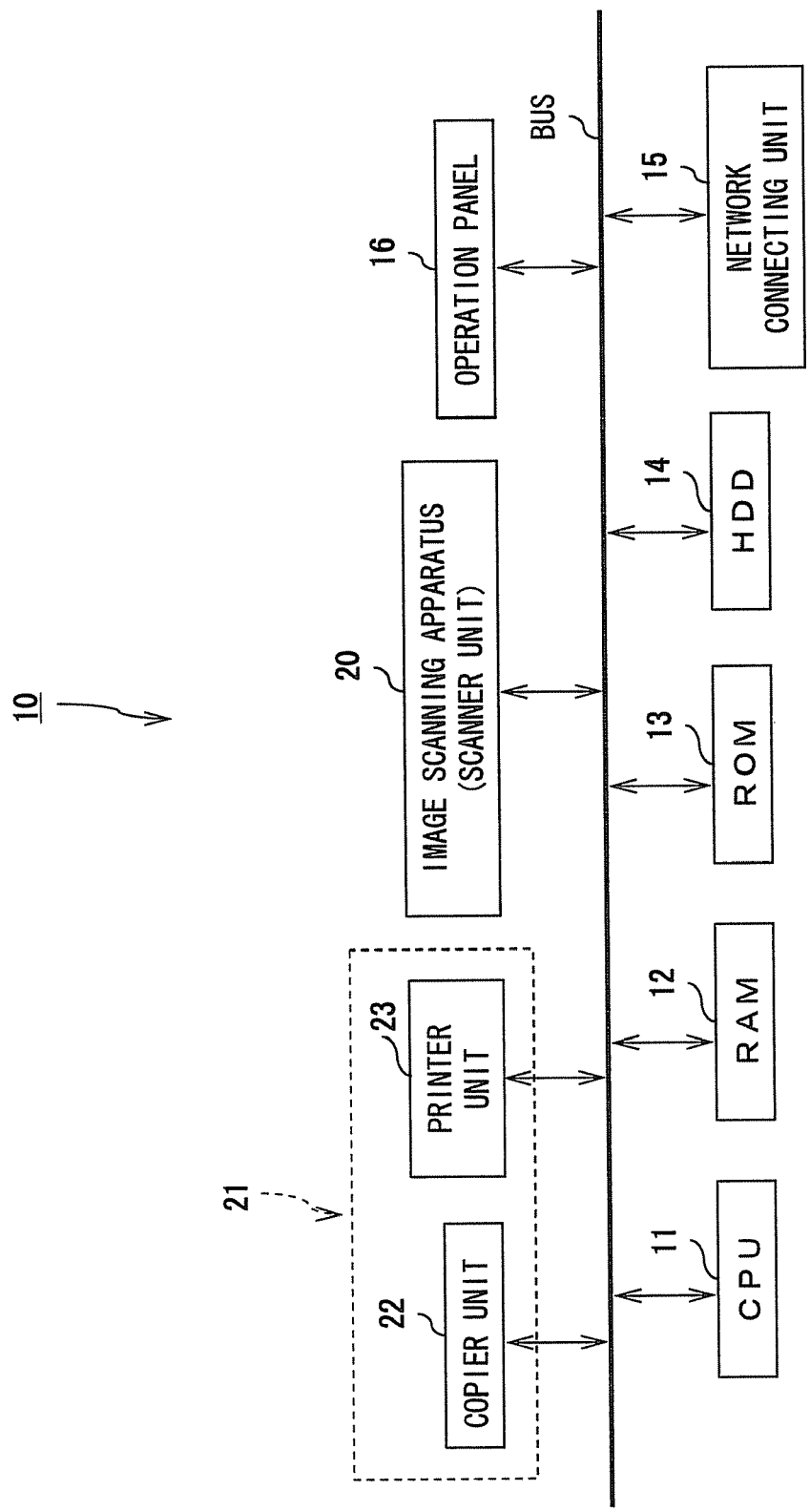
FIG. 1 is a view showing an exemplary configuration of an image forming apparatus according to an embodiment of the invention.

FIG. 1 is a view showing an exemplary configuration of an image forming apparatus according to an embodiment of the invention.

In this embodiment, a multi-function peripheral (MFP) having a copy function, printer function, scanner function and so on is used as an example of this image forming apparatus.

An image forming apparatus 10 has a CPU 11, a RAM 12, a ROM 13, an HDD 14, a network connecting unit 15, an operation panel 16 as an operation unit, an image scanning apparatus 20 (scanner unit), and an image forming unit 21.

The CPU 11 controls operation of the image forming apparatus 10 in accordance with a program stored in the ROM 13. The CPU 11 loads an original double-side simultaneous scanning program stored in the ROM 13 and necessary data for execution of the program to the RAM 12. The CPU 11 controls the image scanning apparatus 20 in accordance with the original double-side simultaneous scanning program and thus simultaneously executes simultaneous scanning of both side of an original and processing to normalize the direction of the scanned face-side image and back-side image according to the type of the double-side original (hereinafter, referred to as normalization processing).

The RAM 12 provides a work area in which the program executed by the CPU 11 and data are temporarily stored.

The ROM 13 stores a start-up program of the image forming apparatus 10 including the image scanning apparatus 20, the original double-side simultaneous scanning program, and various data necessary for execution of these programs.

The ROM 13 may have a configuration including a recording medium readable by the CPU 11 such as a magnetic or optical recording medium or a semiconductor memory, and may be configured to have a part or all of the programs and data in the ROM 13 downloaded through an electronic network.

The hard disk drive (HDD) 14 stores at least an image scanned by the image scanning apparatus 20.

In the network connecting unit 15, various telecommunication protocols corresponding to the form of network are loaded. The network connecting unit 15 connects the image forming apparatus 10 with another electric device in accordance with these various protocols. This connection can utilize electric connection via an electronic network. Here, the electronic network refers to general telecommunication networks using electric communication techniques, which include LAN (local area network) and the Internet and also include telephone networks, optical fiber communication networks, cable communication networks and satellite communication networks.

The operation panel 16 as an operation unit has hard keys such as buttons that give their respective proper instruction signals to the CPU 11 when pressed by the operator, and a display input unit. The operation panel 16 accepts at least the setting of the original type, which is either the booklet type or the tablet type, and the setting of the original size.

The display input unit has an LCD as a display unit, and a touch panel provided in the vicinity of the LCD. The LCD is controlled by the main CPU 11 and displays information for operating the image forming apparatus 10 and plural keys for operating the image forming apparatus 10 (hereinafter referred to as soft keys). The touch panel provides information of a position on the touch panel designated by the operator, to the main CPU 11 of the image forming apparatus 10.

The image scanning apparatus 20 realizes the scanner function of the image forming apparatus 10. Meanwhile, the image forming unit 21 realizes the functions of a copier, printer and so on of the image forming apparatus 10. FIG. 1 schematically shows an example where the image forming apparatus 10 has the functions of a scanner, copier and printer, and the image scanning apparatus 20 realizes the scanner function while a copier unit 22 and a printer unit 23 of the image forming unit 21 realize the copier function and the printer function.

(2) Configuration of Image Scanning Apparatus 20

FIG. 2 is a view showing an exemplary configuration of the image scanning apparatus 20 according to this embodiment.

The image scanning apparatus 20 has a face-side scanning unit 31, a back-side scanning unit 32, a counter 33, a counter control unit 34, a total number of times of access calculating unit 35, a reference address calculating unit 36, a calculation formula deciding unit 37, a calculation formula storage unit 38, a face-side address calculating unit 39, a back-side address calculating unit 40, a memory controller 41, an arbiter 42, and a page memory 43 as an image data storage unit.

The face-side scanning unit 31 performs main scanning in a first direction along the main scanning direction and performs sub scanning in a predetermined direction along the sub scanning direction, thereby scanning an image of a predetermined size at a time with respect to the face-side image of an original. The face-side scanning unit 31 outputs this scanned image of the predetermined size as a face-side image element having a predetermined data width.

The back-side scanning unit 32 performs main scanning in a second direction parallel to the first direction and performs sub scanning in the predetermined direction along the sub scanning direction, thereby scanning an image of the predetermined size at a time with respect to the back-side image of the original. The back-side scanning unit 32 outputs this scanned image of the predetermined size as a back-side image element having a predetermined data width.

The image scanning apparatus 20 stores each image element outputted from the face-side scanning unit 31 and the back-side scanning unit 32 to a required memory address in the page memory 43 and thus can construct an image of one page corresponding to the face-side image and the back-side image of the original in the page memory 43 (hereinafter referred to as a scanning output image).

The first direction and the second direction may be the same direction. The predetermined direction along the sub scanning direction is opposite to the direction of carrying the original.

The face-side scanning unit 31 and the back-side scanning unit 32 are synchronized with a synchronizing signal and thereby simultaneously scan the face-side image and the back-side image of the original and output each image element. To simultaneously scan both sides of the original, for example, the image scanning apparatus 20 can be configured in such a way that the face-side scanning unit 31 and the back-side scanning unit 32 are arranged facing each other and that the original is carried between the face-side scanning unit 31 and the back-side scanning unit 32 in the direction opposite to the sub scanning direction along the sub scanning direction.

Now, the rotation and inversion type of a scanning output image generated when both sides of the original are simultaneously scanned by the face-side scanning unit 31 and the back-side scanning unit 32 will be briefly described.

The first direction and the second direction for main scanning by the face-side scanning unit 31 and the back-side scanning unit 32 are predetermined directions. Therefore, a scanning output image acquired as a result of storing each image element outputted from the face-side scanning unit 31 and the back-side scanning unit 32 into the page memory 43 in the output order (hereinafter referred to as a non-normalized image) belongs to one of four rotation and inversion types, depending on the first direction and the second direction for main scanning and the double-side original type of the original to be scanned.

Figure 3:
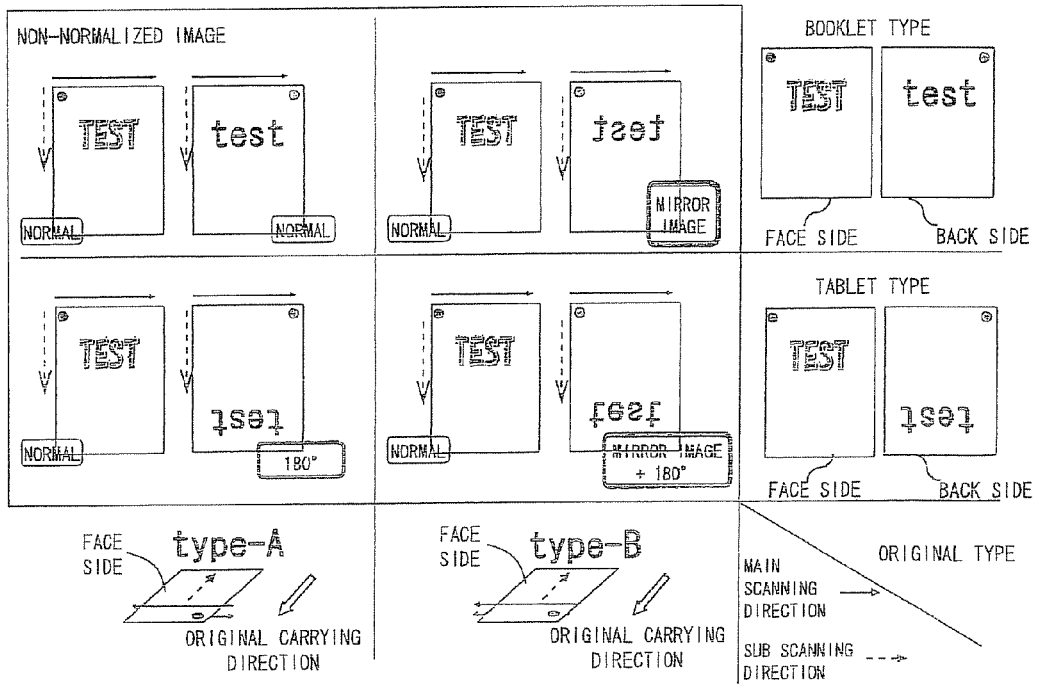
FIG. 3 is a view showing the relation between combination of first and second directions for main scanning by a face-side scanning unit and a back-side scanning unit, type of double-side original to be scanned, and type of rotation and inversion of a non-normalized image.
Figure 3:
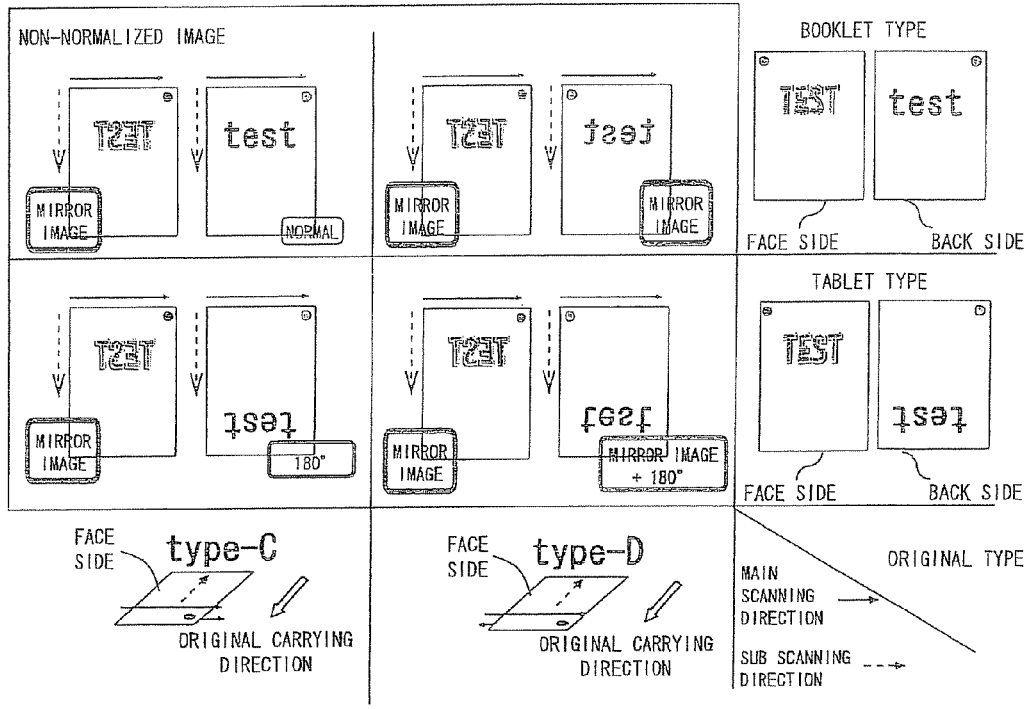

FIG. 3 is a view showing the relation between the combination of the first direction and the second direction for main scanning by the face-side scanning unit 31 and the back-side scanning unit 32, the double-side original type of an original to be scanned, and the rotation and inversion type of a non-normalized image.

As shown in FIG. 3, there are four kinds of combinations of the first direction and the second direction for main scanning (see types-A, B, C and D in FIG. 3). A non-normalized image is classified into one of four rotation and inversion types in accordance with its combination of the first direction and the second direction for main scanning and its double-side original type. Classification into rotation and inversion types can be done in accordance with the up-down direction and the left-right direction of a scanning output image.

An image belonging to the first rotation and inversion type is an image having a normal up-down direction and a normal left-right direction (hereinafter referred to as a normal image) (see, for example, the face side of a booklet type original of type-A in FIG. 3).

In the case of executing processing in which scanning output images are used, it is convenient if all the scanning output images stored in the page memory 43 and the HDD 14 are aligned in the up-down direction and the left-right direction. This processing with scanning output images includes processing such as copying scanning output images by the copier unit 22. Particularly when all the scanning output images stored in the page memory 43 and the HDD 14 are normal images, the normalization of the up-down direction and the left-right direction of the images can be omitted at the time of executing processing in which these images are used.

In the example described in this embodiment, the image scanning apparatus 20 allocates each of the image elements outputted by the face-side scanning unit 31 and the back-side scanning unit 32 to a required memory address in the page memory 43 in accordance with the rotation and inversion type to which its non-normalized image belongs, so that all the scanning output images stored in the page memory 43 become normal images.

An image belonging to the first type need not have its direction normalized. Therefore, for this normal image, each image element outputted by the face-side scanning unit 31 and the back-side scanning unit 32 can be stored into the page memory 43 according to the order in which they are outputted.

An image belonging to the second rotation and inversion type is a mirror image of a normal image (hereinafter referred to as a left-right inverted image) (see, for example, the face side of a booklet type original of type-C in FIG. 3).

An image belonging to the third rotation and inversion type is an image acquired as a result of rotating a normal image by 180 degrees (hereinafter referred to as a 180-degree rotated image) (see, for example, the back side of a tablet type original of type-A in FIG. 3).

An image belonging to the fourth rotation and inversion type is an image acquired by up-down inversion of a normal image (hereinafter referred to as an up-down inverted image) (see, for example, the back side of a tablet type original of type-B in FIG. 3). This up-down inverted image is acquired by further left-right inversion of a 180-degree rotated image.

As shown in FIG. 3, non-normalized images of a face-side image and back-side image can be classified into one of the four rotation and inversion types in accordance with the double-side original type, once their combination of the first direction and the second direction for main scanning is decided.

Combinations of the first direction and the second direction for main scanning are set in advance before the execution of scanning processing of an original. Therefore, the image scanning apparatus 20 can acquire in advance the information about combinations of the first direction and the second direction for main scanning, before executing scanning processing of an original. As the information of the original type of an original to be scanned can be acquired, the rotation and inversion type of the non-normalized image of the face-side image and the back-side image can be decided on the basis of the original to be scanned, before the execution of scanning processing.

For example, it is now assumed that the combination of the first direction and the second direction for main scanning by the face-side scanning unit 31 and the back-side scanning unit 32 is type-C. In this case, if it is known that the original type of the original to be scanned is the tablet type, it can be known in advance that the non-normalized image of the face-side image of this original is a left-right inverted image and that the non-normalized image of the back-side image is a 180-degree rotated image, before the execution of scanning processing (see type-C in FIG. 3).

Thus, when it is assumed that a non-normalized image is constructed for each of the face-side image and the back-side image of the original to be scanned, the image scanning apparatus 20 can predict the rotation and inversion type to which the non-normalized image is to belong. In accordance with the information of the predicted non-normalized image, the image scanning apparatus 20 can execute processing to convert a scanning output image into a normal image (normalization processing).

Figure 4:
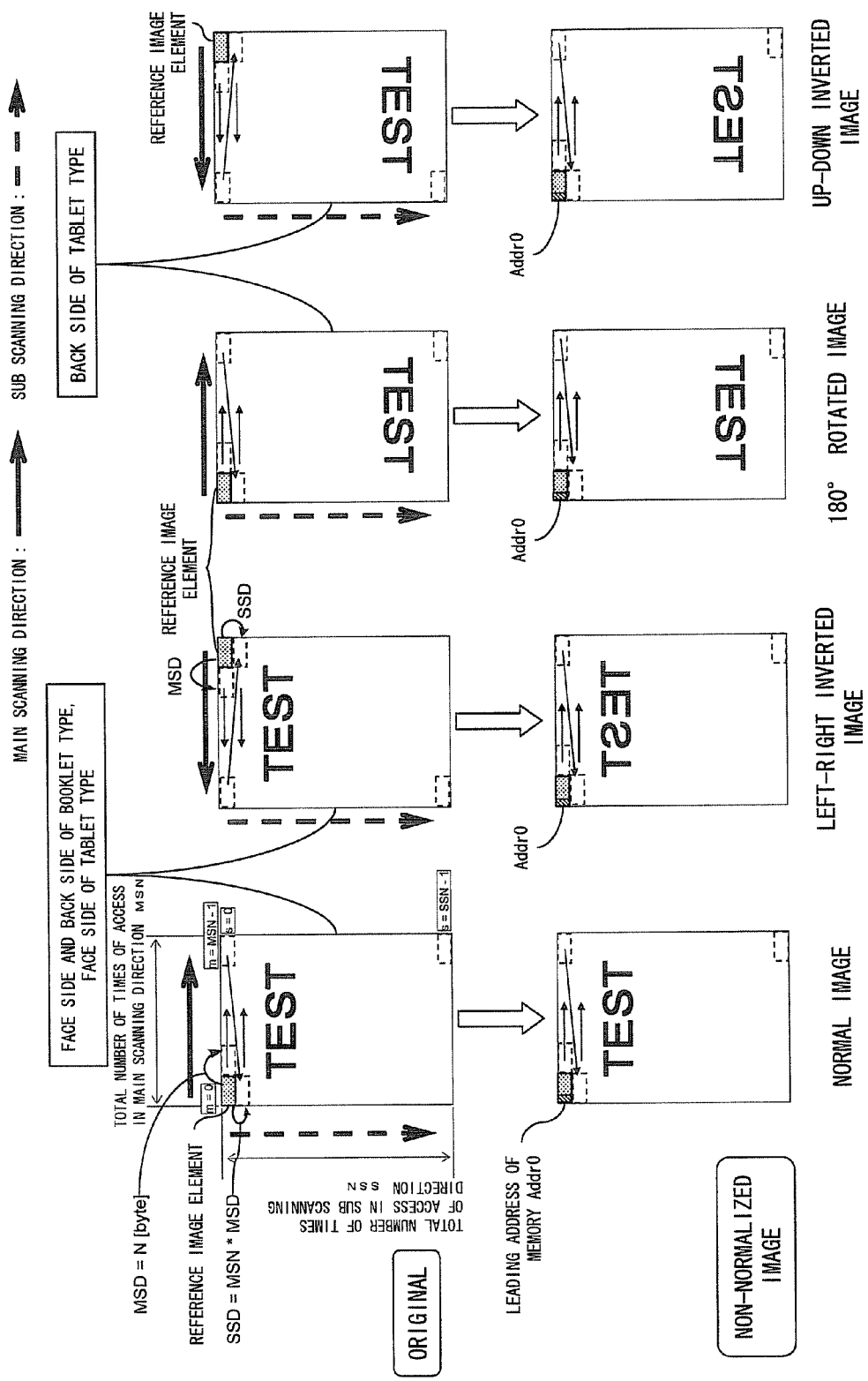
FIG. 4 is a view showing the relation shown in FIG. 3, as classified by rotation and inversion type.

FIG. 4 is a view showing the relation of FIG. 3 as classified by rotation and inversion type. The top of FIG. 4 shows a face-side image or a back-side image printed on an original to be scanned. The bottom of FIG. 4 shows a non-normalized image constructed on a memory map of the page memory 43 in the case where normalization processing is not carried out.

As shown in FIG. 4, if the image elements outputted by the face-side scanning unit 31 and the back-side scanning unit 32 are stored into the page memory 43 according to the order in which they are outputted, a reference image element (the image element to be scanned and outputted at first by the face-side scanning unit 31 and the back-side scanning unit 32) is necessarily stored at the leading address Addr0 in the page memory 43. Therefore, the non-normalized image can be an image that belongs to any of the rotation and inversion types.

For example, in the case of the original shown at the top right in FIG. 4, in order to store the image in the page memory 43 as a normal image, the image element scanned from the bottom right of the original must be stored at the leading address Addr0 in the page memory 43.

Therefore, in order to convert all the scanning output images to normal images, the memory address at which each image element is stored must be controlled in accordance with the rotation and inversion type to which the non-normalized image belongs (that is, normalization of the image must be carried out).

In the following description, an example will be described in which processing to control the memory address at which each image element is stored is carried out mainly by the reference address calculating unit 36, the calculation formula deciding unit 37, the face-side address calculating unit 39 and the back-side address calculating unit 40.

The face-side scanning unit 31 and the back-side scanning unit 32 scan an image of the same predetermined size at a time. The width of this image of the predetermined size in the main scanning direction and its width in the sub scanning direction are set in advance for the face-side scanning unit 31 and the back-side scanning unit 32 before the original is scanned.

Therefore, the values of data width in the main scanning direction (hereinafter referred to as main scanning unit data width MSD) and data width in the sub scanning direction (hereinafter referred to as sub scanning unit data width SSD) of each image element outputted by the face-side scanning unit 31 and the back-side scanning unit 32 can be found in advance before the original is scanned. These unit data widths MSD and SSD can be stored in a required work area in the RAM 12 or a storage medium such as the HDD 14 so that they become available to the image scanning apparatus 20 when necessary.

The counter 33 stores the number of times of main scanning access m and the number of times of sub scanning access s. The counter 33 is controlled by the counter control unit 34 and the numbers of times of scanning access m and s are updated every time the face-side scanning unit 31 scans an image of a predetermined size.

Here, the number of times of main scanning access m is a value that indicates how many times a forward movement in the first direction for main scanning has been made to reach a certain scanned face-side image element, from the first face-side image element that is scanned (hereinafter referred to as a reference image element of the face side). The number of times of sub scanning access s is a value that indicates how many times a forward movement in a predetermined direction along the sub scanning direction has been made to reach a certain scanned face-side image element, from the reference image element.

The total number of times of access calculating unit 35 divides the length of the original in the main scanning direction by the main scanning unit data width MSD in accordance with the information of the original size received via the operation panel 16, and thereby calculates the total number of times of access MSN in the main scanning direction. The total number of times of access calculating unit 35 also divides the length of the original in the sub scanning direction by the sub scanning unit data width SSD and thereby calculates the total number of times of access SSN in the sub scanning direction.

The counter control unit 34 updates the numbers of times of scanning access m (m=0, 1, 2, . . . , MSN−1) and s (s=0, 1, 2, . . . , SSN−1) in accordance with the values of the total numbers of times of access MSN and SSN received from the total number of times of access calculating unit 35.

The reference address calculating unit 36 calculates the memory address in the page memory 43 at which the reference image element of the face side should be stored (hereinafter referred to as a face-side reference address STAf). The reference address calculating unit 36 also calculates the memory address in the page memory 43 at which the reference image element of the back side should be stored (hereinafter referred to as a back-side reference address STAb).

In this embodiment, a case is described where zero is stored in the counter 33 as the values of the number of times of main scanning access m and the number of times of sub scanning access s when the reference face-side image element is scanned.

To calculate the reference addresses STAf and STAb, the information of the rotation and inversion type to which a non-normalized image is to belong when it is assumed that the non-normalized image is constructed, and the information of the scanning unit data widths MSD and SSD are necessary. Also, to calculate the reference addresses STAf and STAb, the information of the leading addresses Addr0f and Addr0b in the area of the page memory 43 where scanning output images of the face-side image and the back-side image of the original should be stored, is necessary.

The reference address calculating unit 36 acquires the rotation and inversion type in accordance with the information of the original type and the information of the first direction and the second direction for main scanning. As the information of the scanning unit data widths MSD and SSD, values stored in advance in a required work area of the RAM 12 or a storage medium such as the HDD 14 can be acquired and used. The leading addresses Addr0f and Addr0b in the area of the page memory 43 are decided in accordance with information of a free area of the page memory 43 and so on and are provided to the reference address calculating unit 36 in advance.

The relation between the reference address STA, the rotation and inversion type to which a non-normalized image is to belong when it is assumed that the non-normalized image is constructed, and Addr0f, Addr0b, MSN, SSN, MSD and SSD can be expressed as follows.

$$STA(normal) = Addr0 \quad (1)$$

$$STA(left\text{-}right) = Addr0 + MSD \times (MSN1) \quad (2)$$

$$STA(180 degrees) = Addr0 + MSD \times (MSN-1) + SSD \times (SSN-1) \quad (3)$$

$$STA(up\text{-}down) = Addr0 + SSD \times (SSN-1) \quad (4)$$

In these equations, "normal", "left-right", "180 degrees" and "up-down" in the parentheses on the left side indicate that equations (1) to (4) correspond to the rotation and inversion types of normal image, left-right inverted image, 180-degree rotated image and up-down inverted image to which a non-normalized image is to belong when it is assumed that the non-normalized image is constructed.

The reference address calculating unit 36 calculates STAf and STAb by applying one of equations (1) to (4) and provides the information of STAf to the face-side address calculating unit 39 and the information of STAb to the back-side address calculating unit 40. The reference address calculating unit 36 also provides the information of the rotation and inversion type to which the non-normalized image is to belong, to the calculation formula deciding unit 37.

Figure 5A:
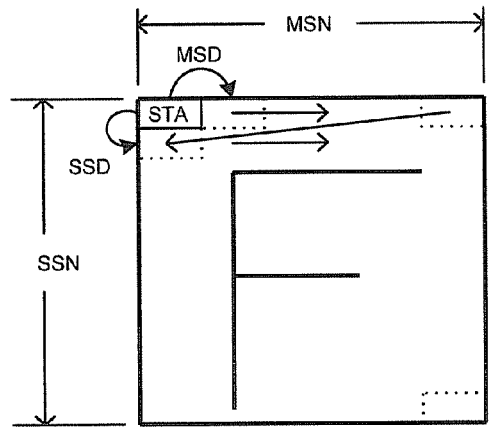
FIG. 5A to FIG. 5D are explanatory views showing the way of allocating each image element to a required memory address in a page memory according to the rotation and inversion type to which a non-normalized image belongs, in order to convert all scanning output images stored in a page memory to normal images.
Figure 5B:
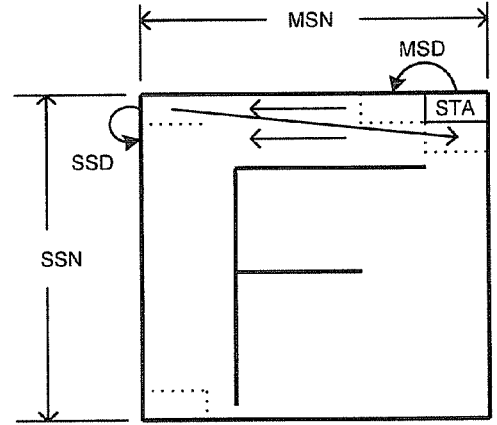
Figure 5C:
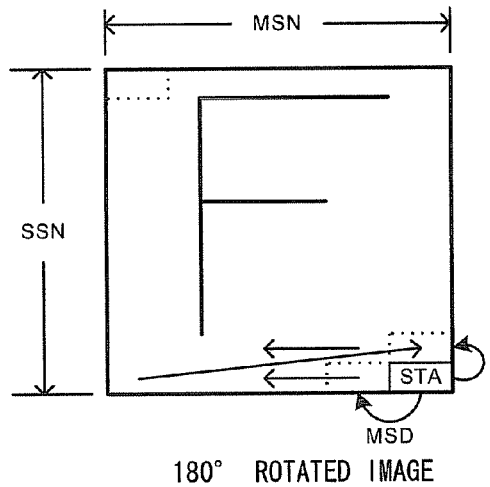
Figure 5D:
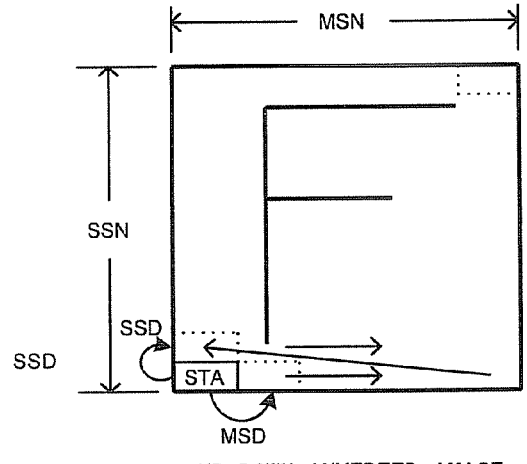

FIG. 5A to FIG. 5D are explanatory views showing allocation of each image element to a required memory address in the page memory 43 according to the rotation and inversion type to which the non-normalized image belongs, in order to convert all the scanning output images stored in the page memory 43 to normal images. FIG. 5A shows the case where the rotation and inversion type to which the non-normalized image is to belong is a normal image. FIG. 5B shows the case where the rotation and inversion type is a left-right inverted image. FIG. 5C shows the case where the rotation and inversion type is a 180-degree rotated image. FIG. 5D shows the case where the rotation and inversion type is an up-down inverted image.

As shown in FIG. 5A to FIG. 5D, the relation between the reference address STA and the memory address to which the image element acquired next to the reference image element should be allocated, varies depending on the rotation and inversion type to which the non-normalized image is to belong.

When the non-normalized image becomes a normal image if normalization processing is not executed, the memory address to which the image element acquired next to the reference image element should be allocated is an address acquired as a result of adding the main scanning unit data width MDS to the reference address STA (see the top left in FIG. 4 and FIG. 5A).

Meanwhile, for example, when the non-normalized image is an up-down inverted image if normalization processing is not executed, the memory address to which the image element acquired next to the reference image element should be allocated is an address acquired as a result of subtracting the main scanning unit data width MDS from the reference address STA (see the top right in FIG. 4 and FIG. 5D).

Therefore, the relation between the reference address STA and the memory address to which each image element should be allocated varies depending on the rotation and inversion type.

The calculation formula deciding unit 37 receives the information of the rotation and inversion type of the face-side image and the back-side image, and acquires a necessary calculation formula for calculating the memory address Addrf to which the face-side image element should be allocated, from the calculation formula storage unit 38. The calculation formula deciding unit 37 also acquires a necessary calculation formula for calculating the memory address Addrb to which the back-side image element should be allocated, from the calculation formula storage unit 38.

In the calculation formula storage unit 38, at least the following four equations (5) to (8) are stored in advance.

$$\text{Addr(normal)} = \text{STA} + m \times \text{MSD} + s \times \text{SSD} \quad (5)$$

$$\text{Addr(left-right)} = \text{STA} - m \times \text{MSD} + s \times \text{SSD} \quad (6)$$

$$\text{Addr(180degrees)} = \text{STA} - m \times \text{MSD} - s \times \text{SSD} \quad (7)$$

$$\text{Addr(up-down)} = \text{STA} + m \times \text{MSD} - s \times \text{SSD} \quad (8)$$

In these equations, "normal", "left-right", "180 degrees" and "up-down" in the parentheses on the left side indicate that equations (5) to (8) correspond to the rotation and inversion types of normal image, left-right inverted image, 180-degree rotated image and up-down inverted image to which a non-normalized image is to belong when it is assumed that the non-normalized image is constructed.

The calculation formula deciding unit 37 reads out one of equations (5) to (8) from the calculation formula storage unit 38 in accordance with the information of the rotation and inversion type received from the reference address calculating unit 36, then decides the formulas for calculating Addrf and Addrb, and provides the information of the calculation formula for Addrf to the face-side address calculating unit 39 and the information of the calculation formula for Addrb to the back-side address calculating unit 40.

The face-side address calculating unit 39 receives the calculation formula for Addrf (one of equations (5) to (8)) from the calculation formula deciding unit 37, substitutes the values of STAf received from the reference address calculating unit 36 and m and s received from the counter 33 into this calculation formula, and thereby calculates the memory address at which each face-side image element should be stored.

As MSD and SSD, values stored in advance in a required work area of the RAM 12 or a storage medium such as the HDD 14 can be acquired and used.

Then, the face-side address calculating unit 39 provides the information of this calculated address Addrf to the memory controller 41.

The back-side address calculating unit 40, similarly to the face-side address calculating unit 39, receives the calculation formula for Addrb (one of equations (5) to (8)) from the calculation formula deciding unit 37, substitutes the values of STAb received from the reference address calculating unit 36 and m and s received from the counter 33 into this calculation formula, and thereby calculates the memory address at which each back-side image element should be stored. Then, the back-side address calculating unit 40 provides the information of this calculated address Addrb to the memory controller 41.

Every time the face-side scanning unit 31 scans an image of a predetermined size, the memory controller 41 receives a face-side image element from the face-side scanning unit 31 and receives the address Addrf at which this face-side image element should be stored, from the face-side address calculating unit 39. The memory controller 41 stores the face-side image element at Addrf in the page memory 43 and thus constructs a scanning output image of the face-side image as a normal image in the page memory 43.

Also, the memory controller 41 receives a back-side image element from the back-side scanning unit 32 and receives the address Addrb at which this back-side image element should be stored, from the back-side address calculating unit 40. The memory controller 41 stores the back-side image element at Addrb in the page memory 43 and thus constructs a scanning output image of the back-side image as a normal image in the page memory 43.

In this memory controller 41, the timing at which the face-side image element and the back-side image element are stored into the page memory 43 is controlled by the arbiter 42.

The face-side image element and the back-side image element may also be temporarily stored in a buffer 51. In this case, the memory controller 41 reads out the face-side image element and the back-side image element from the buffer 51 when necessary.

(3) Operation

Next, an exemplary operation of the image forming apparatus 10 (including the operation of the image scanning apparatus 20) according to this embodiment will be described.

Figure 6:
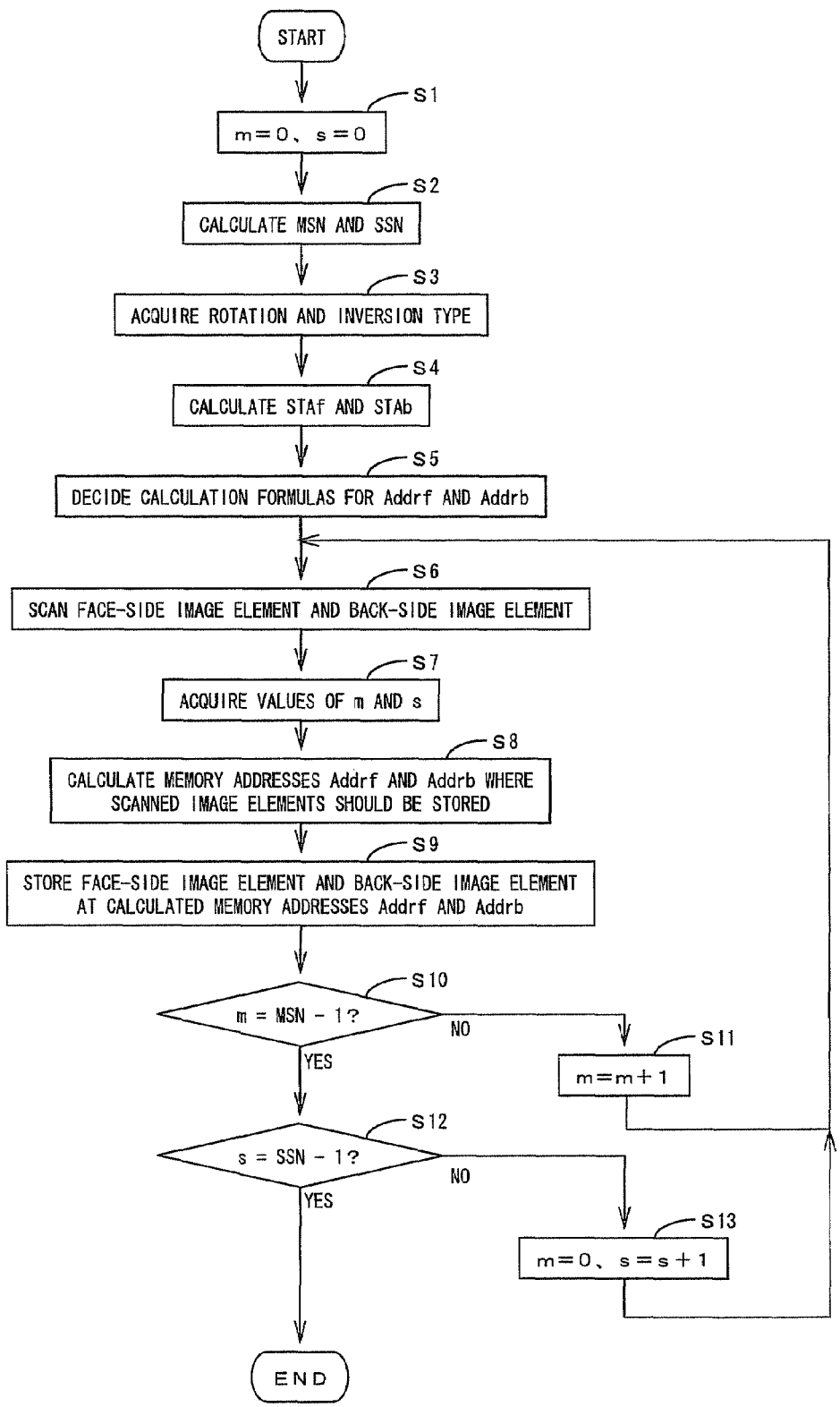
FIG. 6 is a flowchart showing procedures of executing processing to normalize the direction of a scanned output image according to the original type at the same time as simultaneous double-side scanning of an original, in the image scanning apparatus.

FIG. 6 is a flowchart showing procedures of executing processing to normalize the direction of a scanning output image according to the original type at the same time as simultaneous double-side scanning of an original. In FIG. 6, reference numerals with S indicate the steps in the flowchart.

The procedures start when the image scanning apparatus 20 has received, from the user via the operation panel 16, setting information of the original size and double-side original type of an original to be scanned, has then stored this setting information into a required work area in the RAM 12, and has received, from the user via the operation panel 16, an instruction that both sides of the original should be simultaneously scanned.

The information of the leading addresses Addr0f and Addr0b in the area of the page memory 43 where scanning output images of the face-side image and the back-side image are to be stored, and the information about which of types-A, B, C and D in FIG. 3 is the combination of the first direction and the second direction for main scanning in this case are provided in advance to the reference address calculating unit 36. The values of the main scanning unit data width MSD and the sub scanning unit data width SSD of each image element outputted by the face-side scanning unit 31 and the back-side scanning unit 32 are stored in advance in a required work area in the RAM 12.

In the following description, an example is described where the combination of the first direction and the second direction for main scanning is the combination corresponding to type-C in FIG. 3.

First, in step S1, the counter control unit 34 sets zero as the values of the numbers of times of scanning access m and stored in the counter 33.

Next, in step S2, the total number of times of access calculating unit 35 reads out the information of the original size provided in advance by the user via the operation panel 16, from the required work area in the RAM 12, and also reads out the main scanning unit data width MSD from the required work area in the RAM 12. The total number of times of access calculating unit 35 divides the length of the original in the main scanning direction by the main scanning unit data width MSD and thus calculates the total number of times of access MSN in the main scanning direction. The total number of times of access calculating unit 35 also divides the length of the original in the sub scanning direction by the sub scanning unit data width SSD read out from the required work area in the RAM 12 and thus calculates the total number of times of access SSN in the sub scanning direction.

Next, in step S3, the reference address calculating unit 36 reads out the information of the original type provided in advance by the user via the operation panel 16, from the required work area in the RAM 12. In accordance with this information of the original type and the information of the first direction and the second direction for main scanning, the reference address calculating unit 36 acquires the rotation and inversion type to which a non-normalized image is to belong when it is assumed that the non-normalized image is constructed.

For example, when the combination of the first direction and the second direction for main scanning is the combination corresponding to type-C in FIG. 3 and the original type is the tablet type, the reference address calculating unit 36 acquires information that the non-normalized image of the face-side image belongs to the type of left-right inverted image and the non-normalized image of the back-side image belongs to the type of 180-degree rotated image.

Then, the reference address calculating unit 36 provides the acquired information of the rotation and inversion type to the calculation formula deciding unit 37.

Next, in step S4, the reference address calculating unit 36 calculates the face-side reference address STAf and the back-side reference address STAb in accordance with the information of the rotation and inversion type of each of the face-side image and the back-side image, the information of the leading addresses Addr0f and Addr0b in the area of the page memory 43 where the scanning output images of the face-side image and the back-side image should be stored, the information of the scanning unit data widths MSD and SSD, and the information of the total numbers of times of access MSN and SSN (see equations (1) to (4)).

For example, when the non-normalized image of the face-side image is a left-right inverted image, the reference address calculating unit 36 substitutes the various information into equation (2) and thus acquires STAf. When the non-normalized image of the back-side image is a 180-degree rotated image, the reference address calculating unit 36 substitutes the various information into equation (3) and thus acquires STAb.

Then, the reference address calculating unit 36 provides the information of STAf to the face-side address calculating unit 39 and the information of STAb to the back-side address calculating unit 40.

Next, in step S5, the calculation formula deciding unit 37 searches the calculation formula storage unit 38 in accordance with the information of the rotation and inversion type received from the reference address calculating unit 36, and decides the calculation formulas for the memory addresses Addrf and Addrb to which the face-side image element and the back-side image element should be allocated, with respect to each of the face-side image and the back-side image.

For example, when the non-normalized image of the face-side image is a left-right inverted image, the calculation formula deciding unit 37 decides that the calculation formula for Addrf is equation (6). When the non-normalized image of the back-side image is a 180-degree rotated image, the calculation formula deciding unit 37 decides that the calculation formula for Addrb is equation (7).

Then, the calculation formula deciding unit 37 provides the information of the calculation formula for Addrf to the face-side address calculating unit 39 and the information of the calculation formula for Addrb to the back-side address calculating unit 40.

Next, in step S6, the face-side scanning unit 31 and the back-side scanning unit 32 become synchronized with a synchronizing signal, thus simultaneously scan an image of the predetermined size with respect to the face-side image and the back-side image of the original, and output the images of the predetermined size scanned by each scanning unit, as a face-side image element and back-side image element having the predetermined data width. The outputted face-side image element and back-side image element are temporarily stored in the buffer 51.

Next, in step S7, the face-side address calculating unit 39 and the back-side address calculating unit 40 acquire the values of the numbers of times of scanning access m and s from the counter 33. At the time when the reference image element is scanned, both m and s are zero.

Next, in step S8, the face-side address calculating unit 39 calculates the memory address Addrf in the page memory 43 where the scanned face-side image element should be stored in accordance with the numbers of times of scanning access m and s, the main scanning unit data width MSD read out from the required work area in the RAM 12, the reference address STAf received from the reference address calculating unit 36, and the calculation formula for Addrf received from the calculation formula deciding unit 37 (see equations (5) to (8)).

The back-side address calculating unit 40, similarly to the face-side address calculating unit 39, calculates the memory address Addrb in the page memory 43 where the scanned back-side image element should be stored in accordance with the numbers of times of scanning access m and s, the sub scanning unit data width SSD read out from the required work area in the RAM 12, the reference address STAb received from the reference address calculating unit 36, and the calculation formula for Addrb received from the calculation formula deciding unit 37.

Then, the face-side address calculating unit 39 and the back-side address calculating unit 40 provide the calculated memory addresses Addrf and Addrb to the memory controller 41.

Next, in step S9, the memory controller 41 stores the face-side image element stored in the buffer 51, to the memory address Addrf in the page memory 43. The memory controller 41 also stores the back-side image element stored in the buffer 51, to the memory address Addrb in the page memory 43.

Then, in steps S10 to S13, the counter control unit 34 updates the numbers of times of scanning access m and s stored in the counter 33.

First, in step S10, the counter control unit 34 determines whether the number of times of main scanning access m stored in the counter 33 is equal to the value of MSN minus 1 or not. If it is different, the processing goes to step S1. On the other hand, if it is equal, the processing goes to step S12.

Next, in step S11, the counter control unit 34 sets the value of the number of times of main scanning access m stored in the counter 33 plus 1, as the new number of times of main scanning access m. Then, the processing goes back to step S6.

Meanwhile, in step S12, the counter control unit 34 determines whether the number of times of sub scanning access stored in the counter 33 is equal to the value of SSN minus 1 or not. If it is different, the processing goes to step S13. On the other hand, if it is equal, it means that the scanning of the face-side image and the back-side image has been finished, and therefore the series of procedures ends.

Next, in step S13, the counter control unit 34 sets the number of times of main scanning access m stored in the counter 33 to zero, and sets the value of the number of times of sub scanning access s plus 1 as the new number of times of sub scanning access s. Then, the processing goes back to step S6.

By the above procedures, processing to normalize the direction of the scanning output images according to the original type can be executed at the same time as simultaneous double-side scanning of the original.

In the image scanning apparatus 20 according to this embodiment, the memory addresses Addrf and Addrb in the page memory 43 where each image element should be stored can be calculated simultaneously with processing to acquire each image element. Therefore, the memory addresses Addrf and Addrb at which the image elements should be stored can be such addresses that scanning output images are constructed as normal images in the page memory 43. Thus, with the image scanning apparatus 20 according to this embodiment, processing to normalize the image direction according to the type of the double-side original can be executed at the same time as simultaneous double-side scanning of the original.

Also, with the image scanning apparatus 20 according to this embodiment, the up-down direction and the left-right direction of all the scanning output images can be aligned easily and quickly, compared to the conventional technique of carrying out normalization processing after constructing scanning output images. Therefore, in the case of executing a series of processing from simultaneous double-side scanning of a double-side original to double-side copying and so on, when the CPU 11 executes processing that uses scanning output images, the time required for the entire processing can be significantly reduced.

Moreover, in the image scanning apparatus 20 according to this embodiment, the face-address calculating unit 39 and the back-side address calculating unit 40 can acquire the numbers of times of scanning access m and s from the single common counter 33. Therefore, in the case where the counter 33 is configured with hardware, the hardware configuration of the image scanning apparatus 20 can be simplified.

The present invention is not limited to the above embodiment. In practice, components of the embodiment can be modified without departing from the scope of the invention. Also, various inventions can be formed by proper combinations of plural components disclosed in the above embodiment. For example, some of all the components disclosed in the embodiment may be deleted.

Moreover, though the embodiment of the invention discloses an example of processing where the steps in the flowchart are carried out in time series in the described order, the steps of the processing need not necessarily carried out in time series and can be executed in parallel or individually.

What is claimed is:

1. An image scanning apparatus that simultaneously scans a face-side image and a back-side image of an original with respect to two types of originals of a booklet type and a tablet type, the apparatus comprising:
    a face-side scanning unit configured to perform main scanning in a first direction along a main scanning direction and perform sub scanning in a predetermined direction along a sub scanning direction, thereby scan an image of a predetermined size at a time with respect to the face-side image of the original, and output the image of the predetermined size as a face-side image element having a predetermined data width;
    a back-side scanning unit configured to perform main scanning in a second direction parallel to the first direction and perform sub scanning in the predetermined direction along the sub scanning direction, thereby scan an image of the predetermined size at a time with respect to the back-side image of the original, and output the image of the predetermined size as a back-side image element having the predetermined data width;
    a face-side address calculating unit configured to calculate a memory address at which each of the face-side image elements should be stored according to the original type, with respect to each of the face-side image elements outputted from the face-side scanning unit;
    a back-side address calculating unit configured to calculate a memory address at which each of the back-side image elements should be stored according to the original type, with respect to each of the back-side image elements outputted from the back-side scanning unit; and
    an image data storage unit configured to store each of the face-side image elements and the back-side image elements to the memory address at which each element should be stored, and thereby store the face-side image and the back-side image;
    wherein the face-side scanning unit and the back-side scanning unit scan the image of the predetermined size synchronously with a synchronizing signal and simultaneously with each other; and
    the face-side address calculating unit and the back-side address calculating unit calculate the memory address at which each of the face-side image elements and each of the back-side image elements should be stored according to the original type, in such a manner that the face-side image and the back-side image to be stored in the image data storage unit have the same up-down direction and the same left-right direction.

2. The image scanning apparatus according to claim 1, further comprising an operation unit configured to accept setting with respect to whether the original type is the booklet type or the tablet type, and setting of size of the original.

3. The image scanning apparatus according to claim 2, further comprising:
    a total number of times of access calculating unit configured to calculate a total number of times of access in the main scanning direction by dividing the length of the original in the main scanning direction by the width of the predetermined size that is scanned at a time in the main scanning direction, in accordance with the size of the original, and to calculate a total number of times of access in the sub scanning direction by dividing the length of the original in the sub scanning direction by the width of the predetermined size in the sub scanning direction; and
    a reference address calculating unit configured to calculate a reference address that is to be a memory address at which a first scanned image of the predetermined size should be stored, in accordance with the original type, the total number of times of access in the main scanning direction, the total number of times of access in the sub scanning direction, leading address in a memory area of the image data storage unit where each of the face-side image element and the back-side image element should be stored, and the predetermined data width.

4. The image scanning apparatus according to claim 3, further comprising a calculation formula deciding unit configured to provide a calculation formula for calculating the memory address at which the face-side image element and the back-side image element should be stored in accordance with the original type, to the face-side address calculating unit and the back-side address calculating unit,
    wherein the face-side address calculating unit and the back-side address calculating unit calculate the memory address at which each of the face-side image element and the back-side image element should be stored in accordance with the original type, on the basis of the calculation formula.

5. The image scanning apparatus according to claim 4, further comprising a memory control unit configured to store each of the face-side image element and the back-side image element received from the face-side scanning unit and the back-side scanning unit into the image data storage unit in such a manner that each of the elements is stored at the memory address calculated by the face-side address calculating unit and the back-side address calculating unit.

6. The image scanning apparatus according to claim 5, further comprising:
    a counter configured to store, every time the face-side scanning unit scans an image of the predetermined size, a number of times of main scanning access that indicates how many times a forward movement has been made in the first direction along the main scanning direction to reach the scanned image from the first scanned image of the predetermined size, and a number of times of sub scanning access that indicates how many times a forward movement has been made in the predetermined direction along the sub scanning direction to reach the scanned image; and
    a counter control unit configured to update the number of times of main scanning access and the number of times of sub scanning access stored in the counter;
    wherein the counter control unit receives the synchronizing signal and updates the number of times of main scanning access and the number of times of sub scanning access.

7. The image scanning apparatus according to claim 6, further comprising a calculation formula storage unit configured to store the calculation formula for calculating the memory address at which the face-side image element and the back-side image element should be stored, in accordance with the original type,
    wherein the calculation formula deciding unit acquires the calculation formula for calculating the memory address by searching the calculation formula storage unit in accordance with the information of the original type.

8. An image forming apparatus that simultaneously scans a face-side image and a back-side image of an original with respect to two types of originals of a booklet type and a tablet type, the apparatus comprising:
    a scanner unit; and
    an image forming unit configured to print image scanned by the scanner unit, onto a recording paper,
    the scanner unit comprising:
    a face-side scanning unit configured to perform main scanning in a first direction along a main scanning direction and perform sub scanning in a predetermined direction along a sub scanning direction, thereby scan an image of a predetermined size at a time with respect to the face-side image of the original, and output the image of the predetermined size as a face-side image element having a predetermined data width;
    a back-side scanning unit configured to perform main scanning in a second direction parallel to the first direction and perform sub scanning in the predetermined direction along the sub scanning direction, thereby scan an image of the predetermined size at a time with respect to the back-side image of the original, and output the image of the predetermined size as a back-side image element having the predetermined data width;
    a face-side address calculating unit configured to calculate a memory address at which each of the face-side image elements should be stored according to the original type, with respect to each of the face-side image elements outputted from the face-side scanning unit;
    a back-side address calculating unit configured to calculate a memory address at which each of the back-side image elements should be stored according to the original type, with respect to each of the back-side image elements outputted from the back-side scanning unit; and
    an image data storage unit configured to store each of the face-side image elements and the back-side image elements to the memory address at which each element should be stored, and thereby store the face-side image and the back-side image;
    wherein the face-side scanning unit and the back-side scanning unit scan the image of the predetermined size synchronously with a synchronizing signal and simultaneously with each other; and
    the face-side address calculating unit and the back-side address calculating unit calculate the memory address at which each of the face-side image elements and each of the back-side image elements should be stored according to the original type, in such a manner that the face-side image and the back-side image to be stored in the image data storage unit have the same up-down direction and the same left-right direction.

9. The image forming apparatus according to claim 8, further comprising an operation unit configured to accept setting with respect to whether the original type is the booklet type or the tablet type, and setting of size of the original.

10. The image forming apparatus according to claim 9, further comprising:
    a total number of times of access calculating unit configured to calculate a total number of times of access in the main scanning direction by dividing the length of the original in the main scanning direction by the width of the predetermined size that is scanned at a time in the main scanning direction, in accordance with the size of the original, and to calculate a total number of times of access in the sub scanning direction by dividing the length of the original in the sub scanning direction by the width of the predetermined size in the sub scanning direction; and
    a reference address calculating unit configured to calculate a reference address that is to be a memory address at which a first scanned image of the predetermined size should be stored, in accordance with the original type, the total number of times of access in the main scanning direction, the total number of times of access in the sub scanning direction, leading address in a memory area of the image data storage unit where each of the face-side image element and the back-side image element should be stored, and the predetermined data width.

11. The image forming apparatus according to claim 10, further comprising a calculation formula deciding unit configured to provide a calculation formula for calculating the memory address at which the face-side image element and the back-side image element should be stored in accordance with the original type, to the face-side address calculating unit and the back-side address calculating unit, wherein the face-side address calculating unit and the back-side address calculating unit calculate the memory address at which each of the face-side image element and the back-side image element should be stored in accordance with the original type, on the basis of the calculation formula.

12. The image forming apparatus according to claim 11, further comprising a memory control unit configured to store each of the face-side image element and the back-side image element received from the face-side scanning unit and the back-side scanning unit into the image data storage unit in such a manner that each of the elements is stored at the memory address calculated by the face-side address calculating unit and the back-side address calculating unit.

13. The image forming apparatus according to claim 12, further comprising:

a counter configured to store, every time the face-side scanning unit scans an image of the predetermined size, a number of times of main scanning access that indicates how many times a forward movement has been made in the first direction along the main scanning direction to reach the scanned image from the first scanned image of the predetermined size, and a number of times of sub scanning access that indicates how many times a forward movement has been made in the predetermined direction along the sub scanning direction to reach the scanned image; and a counter control unit configured to update the number of times of main scanning access and the number of times of sub scanning access stored in the counter;

wherein the counter control unit receives the synchronizing signal and updates the number of times of main scanning access and the number of times of sub scanning access.

14. The image forming apparatus according to claim 13, further comprising a calculation formula storage unit configured to store the calculation formula for calculating the memory address at which the face-side image element and the back-side image element should be stored, in accordance with the original type, wherein the calculation formula deciding unit acquires the calculation formula for calculating the memory address by searching the calculation formula storage unit in accordance with the information of the original type.

15. An image scanning method in which a face-side image and a back-side image of an original are simultaneously scanned with respect to two types of originals of a booklet type and a tablet type, the method comprising:

scanning the face-side comprising performing main scanning in a first direction along a main scanning direction and performing sub scanning in a predetermined direction along a sub scanning direction, thereby scanning an image of a predetermined size at a time with respect to the face-side image of the original, and outputting the image of the predetermined size as a face-side image element having a predetermined data width;

scanning the back-side comprising performing main scanning in a second direction parallel to the first direction and performing sub scanning in the predetermined direction along the sub scanning direction, thereby scanning an image of the predetermined size at a time with respect to the back-side image of the original, and outputting the image of the predetermined size as a back-side image element having the predetermined data width;

calculating a memory address at which each of the face-side image elements should be stored according to the original type;

calculating a memory address at which each of the back-side image elements should be stored according to the original type; and storing each of the face-side image elements and the back-side image elements to the memory address at which each element should be stored, and thereby storing the face-side image and the back-side image into an image data storage unit;

wherein the scanning the face-side and the scanning the back-side execute scanning the image of the predetermined size synchronously with a synchronizing signal and simultaneously with each other; and in the calculating the memory address at which each of the front-side image elements should be stored and in the calculating the memory address at which each of the back-side image elements should be stored, the memory addresses are calculated according to the original type, in such a manner that the face-side image and the back-side image to be stored in the image data storage unit have the same up-down direction and the same left-right direction.

16. The image scanning method according to claim 15, further comprising acquiring setting with respect to whether the original type is the booklet type or the tablet type, and setting of size of the original, as these settings are inputted by an operation unit.

17. The image scanning method according to claim 16, further comprising:

calculating a total number of times of access in the main scanning direction by dividing the length of the original in the main scanning direction by the width of the predetermined size that is scanned at a time in the main scanning direction, in accordance with the size of the original, and calculating a total number of times of access in the sub scanning direction by dividing the length of the original in the sub scanning direction by the width of the predetermined size in the sub scanning direction; and calculating a reference address that is to be a memory address at which a first scanned image of the predetermined size should be stored, in accordance with the original type, the total number of times of access in the main scanning direction, the total number of times of access in the sub scanning direction, leading address in a memory area of the image data storage unit where each of the face-side image element and the back-side image element should be stored, and the predetermined data width.

18. The image scanning method according to claim 17, further comprising acquiring a calculation formula for calculating the memory address at which the face-side image element and the back-side image element should be stored in accordance with the original type;

wherein in the calculating the memory address at which each of the front-side image elements should be stored and in the calculating the memory address at which each of the back-side image elements should be stored, the memory addresses are calculated in accordance with the original type, on the basis of the calculation formula.

19. The image scanning method according to claim 18, further comprising storing each of the face-side image element and the back-side image element into the image data storage unit in such a manner that each of the elements is stored at the calculated memory address.

20. The image scanning method according to claim 19, further comprising:
- acquiring, every time an image of the predetermined size is scanned in the scanning the face-side, a number of times of main scanning access that indicates how many times a forward movement has been made in the first direction along the main scanning direction to reach the scanned image from the first scanned image of the predetermined size, and a number of times of sub scanning access that indicates how many times a forward movement has been made in the predetermined direction along the sub scanning direction to reach the scanned image; and
- updating the number of times of main scanning access and the number of times of sub scanning access that are acquired;
- wherein in the updating the synchronizing signal is received and the number of times of main scanning access and the number of times of sub scanning access are updated thereafter.

* * * * *